(12) United States Patent
Antonis (10) Patent No.: US 9,046,345 B2
(45) Date of Patent: Jun. 2, 2015

(54) OPTICAL PROBE (76) Inventor: Jan Antonis, Larne (GB)

( * ) Notice: Subject to any disclaimer, the term of this patent is extended or adjusted under 35 U.S.C. 154(b) by 500 days.

(21) Appl. No.: 12/771,800

(22) Filed: Apr. 30, 2010

(65) Prior Publication Data

US 2010/0277582 A1 Nov. 4, 2010

(30) Foreign Application Priority Data

Apr. 30, 2009 (GB) .................................. 0907394.1

(51) Int. Cl.
H04N 7/18 (2006.01)
G01B 11/00 (2006.01)

(52) U.S. Cl.
CPC ..................... G01B 11/002 (2013.01)

(58) Field of Classification Search
USPC .......................................................... 348/137
See application file for complete search history.

(56) References Cited

U.S. PATENT DOCUMENTS

| 5,408,189 | A * | 4/1995 | Swart et al. ............... 324/750.22 |
| 7,046,273 | B2 * | 5/2006 | Suzuki ........................... 348/157 |
| 7,064,775 | B2 * | 6/2006 | Takakuwa ...................... 348/164 |
| 7,483,049 | B2 * | 1/2009 | Aman et al. ................... 348/162 |
| 8,009,192 | B2 * | 8/2011 | Raskar et al. ................. 348/135 |
| 8,077,914 | B1 * | 12/2011 | Kaplan ......................... 382/103 |
| 2004/0046881 | A1 * | 3/2004 | Utagawa ....................... 348/294 |
| 2004/0090533 | A1 * | 5/2004 | Dow et al. .................. 348/220.1 |
| 2005/0190986 | A1 * | 9/2005 | Sakurai ......................... 382/275 |
| 2007/0018082 | A1 * | 1/2007 | Ohtsu et al. ................. 250/227.3 |
| 2007/0034731 | A1 * | 2/2007 | Falco ............................. 244/3.1 |
| 2007/0091178 | A1 * | 4/2007 | Cotter et al. ................... 348/159 |
| 2007/0219450 | A1 * | 9/2007 | Azar et al. ..................... 600/476 |
| 2007/0286514 | A1 * | 12/2007 | Brown et al. ................. 382/254 |
| 2008/0012939 | A1 * | 1/2008 | Dobrin ......................... 348/139 |
| 2008/0123910 | A1 * | 5/2008 | Zhu .............................. 382/128 |
| 2008/0284902 | A1 * | 11/2008 | Konno et al. ................. 348/370 |
| 2010/0171819 | A1 * | 7/2010 | Tolkowsky et al. ............. 348/65 |
| 2010/0265333 | A1 * | 10/2010 | Gordon et al. ................. 348/164 |
| 2012/0044350 | A1 * | 2/2012 | Verfuerth ..................... 348/143 |

* cited by examiner

Primary Examiner — Andy Rao
Assistant Examiner — James Edwards
(74) Attorney, Agent, or Firm — Preston Smirman; Smirman IP Law, PLLC (57) ABSTRACT An optical probe having a hand held device with markers, a digital camera for digitally imaging the handheld device with markers, and a computer for calculating the position of the hand held device from the position of the markers in the digital image. This allows the hand held device to be used to take measurements, wherein the digital camera is a high resolution visible light digital camera and the markers are visible light markers.

17 Claims, 7 Drawing Sheets

OPTICAL PROBE

CROSS-REFERENCE TO RELATED APPLICATION

The instant application claims priority to United Kingdom Patent Application No. 0907394.1, filed Apr. 30, 2009, pending, the entire specification of which is expressly incorporated herein by reference.

FIELD OF THE INVENTION

The present invention relates to an optical probe and in particular to an optical probe for reducing the complexity of the apparatus and reducing the processing power required to take accurate measurements.

BACKGROUND OF THE INVENTION

An optical probe is a measuring device, which can be used like a traditional Coordinate Measuring Machine (CMM) arm supplied by manufacturers such as Faro or Romer. However, unlike a CMM arm, an optical probe has no mechanical mechanisms to wear, brake or calibrate. Instead, it consists of a hand held device with markers, a digital camera and a computer. The digital camera images the hand held device and its markers and a computer calculates the position of the hand held device from the position of the markers in the digital image. This allows the hand held device to be used to take measurements While other optical probes do exist they suffer from a number of problems. One group of prior art probes requires the use of expensive narrow spectrum cameras and markers. When a digital image of an optical probe is taken, the location of the markers in the image must be determined very accurately, usually to sub pixel level. To achieve a fast measuring speed or high frame rate, it is essential that the markers are extracted quickly from the digital images, e.g., in a time of approximately 30 milliseconds. If the image contains a lot of data other than the markers, a large amount of image processing is required to extract the markers. To reduce unwanted image content, the prior art systems use narrow spectrum digital cameras (e.g., infra-red or near infra-red) and point light source markers. These cameras and markers are much more specialized and consequently more expensive than traditional visible light cameras.

These systems also require the use of point light source markers and these point light source markers can introduce inaccuracy into the system. The point light source markers facilitate fast extraction of the markers from the image as these require very little image processing. However, point light sources can create systematic errors in their estimated location when they are either overexposed, moving, out of focus and affected by the inevitable perspective associated with any image.

Other systems use high frequency digital image acquisition techniques often referred to as an electronic shutter. As an optical probe is usually a hand held device, it cannot be considered a static device. If the probe moves at a speed of 100 mm/s, then it will move 0.1 mm in 1 millisecond. The accuracy of a typical CMM arm is less than 0.1 mm, therefore it is essential that the optical probe is imaged in as short a time as possible. In order to achieve this, prior art optical probes electronically read the digital camera sensor at a very high frequency. In the case of CCD sensors, this digital process is prone to blooming, smearing or overexposure during the imaging process, and in the case of CMOS sensors, this allows tearing of the image. While both of these problems may be acceptable in a traditional imaging system, they introduce unwanted errors in the estimation of the markers location.

SUMMARY OF THE INVENTION

It is an object of the present invention to obviate or mitigate the problems of the prior art optical probes outlined above.

Accordingly, the present invention provides an optical probe comprising a hand held device with markers, a digital camera for digitally imaging the handheld device with markers and a computer for calculating the position of the hand held device from the position of the markers in the digital image wherein the digital camera is a high resolution visible light digital camera and the markers are visible light markers.

Advantageously, visible light cameras and visible light markers are mass produced and technically less complex and as a result cost less than the more specialized narrow spectrum cameras and the point source markers respectively.

Preferably, the handheld device has a plurality of spaced apart visible light markers mounted thereon.

Ideally, the visible light markers are provided by one or more LEDs covered by a white disc, preferably acrylic. Advantageously, the LED's and the white acrylic disc provide a diffuse white light background.

Preferably, a sheet, most preferably of polymer acrylic is adhered to the white disc with location markers printed on the sheet.

Ideally, the handheld device has a protruding measuring stylus with a location tip. Essentially, the spatial location of the location tip of the measuring stylus is known relative to the spatial location of the visible light markers.

Preferably, the handheld device has trigger means in operable engagement with control means of the high resolution visible light digital camera.

Ideally, the resolution of the visible light digital camera is in the range of 5 to 500 megapixels.

Preferably, the resolution of the digital camera is in the range of 10 to 30 megapixels.

In a first embodiment, the high resolution visible light digital camera has two modes of operation.

Ideally, the first mode of operation is a low resolution video mode for real-time tracking of the handheld device. In this mode the precise geometrical location of the visible light markers is not required to be extracted from the images recorded by the digital camera and therefore the processing power in this mode is significantly reduced in comparison to the measuring mode.

Preferably, the resolution of the visible light camera allows at least one measurement per second in the low resolution mode.

Preferably, the second mode of operation is a very high resolution still mode for taking precise measurements of the spatial location of the visible light markers.

Ideally, the resolution of the visible light camera in the video mode is relatively small compared to the resolution of the visible light camera in the measurement mode.

Preferably, the ratio of measurement mode resolution to video mode resolution is in the range of between 10 and 20 to 1. There is also a significant relative change in frame rate.

As a result of the camera and markers being of the visible light type, more image processing is required to extract the markers from the image in the measuring mode. To offset this, the digital camera can optionally operate in two modes, a low resolution video mode for real-time tracking of the optical probe and a very high resolution still mode for taking measurements. Advantageously, the exact location of the markers is only required in the still mode reducing the processing power during the low resolution tracking mode. A 16 MP camera creating 30 images of 24 bits per pixel would create 1.44 Gigabytes of information every second. Clearly this is a huge amount of data to transmit from the camera to the computer and then to process in the computer. If a lower tracking resolution is acceptable it is therefore advantageous to create an optical probe which is operable at 2 resolutions, a low resolution for tracking and a high resolution for single important measurements.

Therefore, the general location of the markers of the hand held device are already defined by the computer within the video tracking mode. On actuation of a trigger, a very high resolution still mode image is taken by the visible light camera for taking high accuracy measurements. The processing power required to identify the exact location of the markers in the high resolution image is greatly reduced by the fact that their general location has already been defined by the computer during the low resolution tracking mode. This significantly reduces the amount of the high resolution image which must be analyzed to initially determine the general location of the markers.

Preferably, the high resolution digital camera has a mechanical shutter. Advantageously, a physical shutter is used to expose the sensor during the acquisition of full resolution measurement images to eliminate the inaccuracies caused by tearing, blooming or smearing in the image.

Ideally, the trigger means is in operable communication with control means of the mechanical shutter of the high resolution visible light digital camera.

Ideally, actuation of the control means of the mechanical shutter switches the high resolution visible light digital camera between the low resolution mode and the high resolution mode.

Ideally, the mechanical shutter is constantly in the open position in the low resolution tracking mode.

Ideally, a second visible light digital camera is operably coupled to the computer for locating the position of the visible light markers.

Preferably, the second visible light digital camera is located so as to receive light at an alternative angle to the angle of incidence of the light falling on the high resolution visible light camera. Advantageously, the second visible light digital camera located at an angularly displaced location relative to the direct line of light from the hand held device to the high resolution visible light camera improves the depth measurement accuracy of the markers by triangulation.

Ideally, the second visible light camera is any one of a low resolution video mode camera such as a webcam, a high resolution visible light camera with a high resolution still mode or a high resolution visible light camera with a high resolution still mode and a low resolution video tracking mode.

In a second embodiment, a high resolution visible light digital camera having a first mode of operation and a second visible light camera having a second mode of operation are operably engaged with the computer for locating the position of the markers of the hand held device.

Ideally, the second mode of operation of the second visible light camera is a low resolution video mode for real-time tracking of the optical probe. In this mode the precise geometrical location of the visible light markers is not required to be extracted from the images recorded by the second visible light camera and therefore the processing power in this mode is significantly reduced in comparison to the measuring mode.

Preferably, the resolution of the second visible light camera allows at least one measurement per second in the low resolution video mode.

Preferably, the first mode of operation of the high resolution visible light camera is a very high resolution still mode for taking precise measurements of the spatial locations of the visible light markers.

Ideally, the resolution of the second visible light camera in the video mode is relatively small compared to the resolution of the first visible light camera in the measurement mode.

Preferably, the ratio of measurement/still mode resolution to video mode resolution is in the range of between 10 and 20 to 1. There is also a significant relative change in frame rate.

As a result of the cameras and markers being of the visible light type, more image processing is required to extract the markers from the image in the measuring mode. To offset this, the second visible light camera operates in a low resolution video mode for real-time tracking of the handheld device. Therefore the general location of the markers of the hand held device is already defined by the computer within the video tracking mode. On actuation of a trigger, a very high resolution still mode image is taken by the first high resolution visible light camera for taking high accuracy measurements. The processing power of the computer required to identify the exact location of the markers in the high resolution image is greatly reduced by the fact that their general location has already been defined by the computer during the low resolution tracking mode. This significantly reduces the amount of the high resolution image which must be analyzed to initially determine the general location of the markers. A lower tracking resolution is acceptable to generally locate the markers of the hand held device so it is therefore advantageous to create an optical probe operable at 2 resolutions, a low resolution for tracking and a high resolution for single important measurements.

Preferably, the high resolution digital camera has a mechanical shutter. Advantageously, a physical shutter is used to expose the sensor during the acquisition of full resolution measurement images to eliminate the inaccuracies caused by tearing, blooming or smearing in the image.

Ideally, the trigger means is in operable communication with control means of the mechanical shutter of the high resolution visible light digital camera.

Ideally, actuation of the control means of mechanical shutter switches the optical probe between the low resolution mode and the high resolution mode.

Ideally, the mechanical shutter is constantly in the open position in the low resolution tracking mode.

In a particularly preferred embodiment, the camera is any one of the range of single lens reflex cameras SLR, preferably by Canon®, for example.

Preferably, the mechanical shutter speed is in the range of 0.1 to 5 milliseconds.

Preferably, a non point visible light source marker is used. Advantageously, the non point visible light source is insensitive to perspective, over-exposure and poor focus.

Ideally, the location markers comprise a circle of material with four equal quadrants, two of which are opaque and two of which are transparent. Advantageously, this design is unaffected by perspective, over-exposure, blur, and relative size. It also facilitates sub-pixel estimation of its position.

Preferably, the point at which the two dark corners of the opaque quadrants meet is considered the marker point. Advantageously, this corner meeting point is clearly not sensitive to scale and hence perspective.

Preferably, a computer program executing on the computer is used to locate corner meeting point q using an underlying mathematical algorithm.

Figure 9:
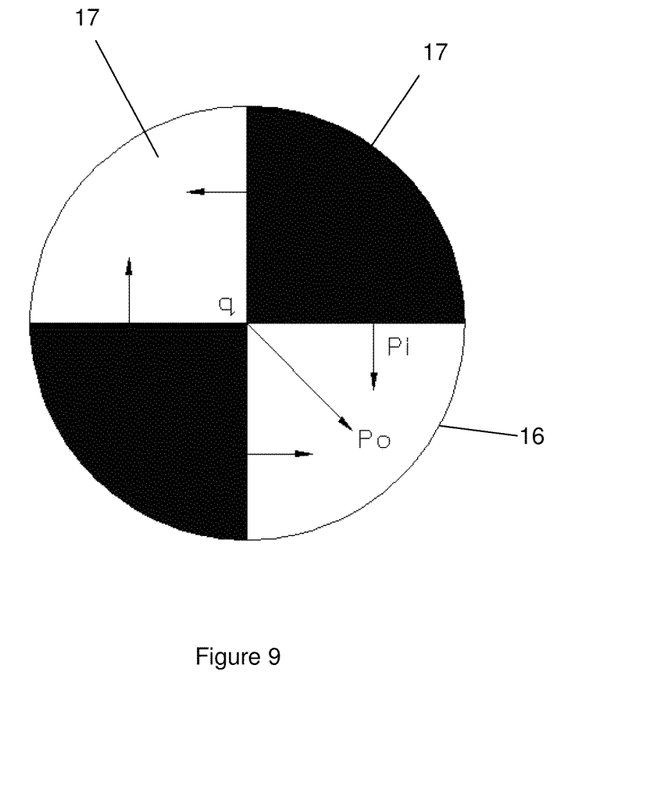
FIG. 9 is a detailed drawing of one embodiment of a visible light location marker, in accordance with the present invention.

Ideally, the core idea of this algorithm with reference to FIG. 9 is based on the observation that every vector from the centre q to a point p located within a neighborhood of q is orthogonal to the image gradient at p subject to image and measurement noise. Thus:

$$\epsilon_i = \nabla I_{pi}^T \nabla (q - p_i)$$

where $\nabla I_{pi}$ is the image gradient at the one of the points p in a neighborhood of q. The value of q is to be found such that $\epsilon_i$ is minimized. A system of equations may be set up with $\epsilon_i$'s set to zero:

$$\left( \sum_i \nabla I_{pi} \nabla \nabla I_{pi}^T \right) \cdot q - \left( \sum_i \nabla I_{pi} \nabla \nabla I_{pi}^T \nabla p_i \right) = 0$$

where the gradients are summed within a neighborhood ("search window") of q.

Calling the first gradient term G and the second gradient term b gives:

$$q = G^{-1} \nabla b$$

The algorithm sets the centre of the neighborhood window at this new centre q and then iterates until the centre keeps within a set threshold.

Accordingly, the present invention provides a method of operating an optical probe having a high resolution visible light digital camera, a computer, a hand held device with visible light markers, the method comprising the steps of identifying the location of the visible light markers using a high resolution visible light digital camera.

Preferably, the method comprising tracking visible light markers of the hand held device in a low resolution video mode until the hand held device is located on a point to be measured.

Ideally, the method comprising switching the optical probe between a low resolution tracking mode and a high resolution measuring mode and taking a still image of the hand held device and visible light markers at this measuring location.

Preferably, the method comprising pressing trigger means on the hand held device to operate a mechanical shutter.

Ideally, the method comprises the digital camera reverting back to low resolution tracking mode after taking a full resolution image.

Preferably, the method comprises the shutter closing in preparation for taking a full resolution image, then opening and closing for taking the full resolution image and opening again thereby returning to video mode.

Preferably, the method comprising the computer extracting the location information of the visible light markers from the high resolution digital image file to provide spatial coordinates of the measured point.

Accordingly the present invention provides a further method of operating an optical probe having a first high resolution visible light digital camera and a second visible light camera, a computer, a hand held device with visible light markers, the method comprising the steps of identifying the location of the visible light markers using both the first high resolution visible light digital camera and the second visible light digital camera.

Preferably, the method comprising tracking visible light markers of the hand held device generally with the second visible light digital camera in a low resolution video mode until the hand held device is located on a point to be measured.

Ideally, the method comprising switching between the second visible light digital camera and the first high resolution visible light digital camera between the low resolution video tracking mode and a high resolution measuring mode, the first high resolution visible light digital camera taking a still image of the hand held device and visible light markers at this measuring location.

Preferably, the method comprising pressing trigger means on the hand held device to operate a mechanical shutter on the first high resolution visible light digital camera at the measuring location.

Ideally, the method comprising the optical probe reverting back to low resolution video tracking mode after taking a full resolution image.

Preferably, the method comprises the shutter closing in preparation for taking a full resolution image, then opening and closing for taking the full resolution image and opening again thereby returning the computer to tracking in the low resolution video mode.

Preferably, the method comprises the computer extracting the general location information of the visible light markers from a low resolution digital image.

Ideally, the method further comprising the step of the computer extracting the exact location information of the visible light markers using the high resolution digital image file to provide spatial coordinates of the measured point starting from the information provided by the generally defined spatial coordinates of the low resolution image file. Advantageously, the processing power required to identify the exact location of the markers in the high resolution image is greatly reduced by the fact that their general location has already been defined by the computer during the low resolution tracking mode. This significantly reduces the amount of the high resolution image which must be analyzed to initially determine the general location of the markers. A lower tracking resolution is acceptable to generally locate the markers of the hand held device so it is therefore advantageous to create an optical probe with two visible light cameras one which can operate at a low resolution for tracking and the other which can operate at a high resolution for single important measurements.

Ideally, the second visible light digital camera having high resolution capabilities, the method comprising pressing the trigger on the handheld device so either or both visible light digital cameras take a high resolution still mode image for processing the location coordinates of the markers.

Preferably, wherein both visible light digital cameras have high resolution and low resolution capabilities, the method comprising either or both visible light digital light cameras tracking the hand held device in low resolution mode and either or both visible light digital cameras taking a high resolution image when the trigger is pressed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Other advantages of the present invention will be readily appreciated as the same becomes better understood by reference to the following detailed description when considered in connection with the accompanying drawings wherein.

The same reference numerals refer to the same parts throughout the various Figures.

DETAILED DESCRIPTION OF THE INVENTION

Figure 1:
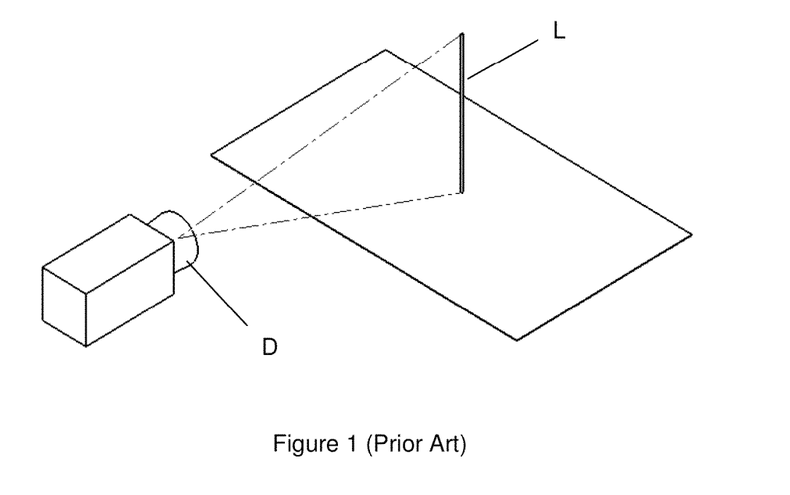
FIG. 1 is a prior art optical probe with a digital camera using a CMOS imaging device.
Figure 2:
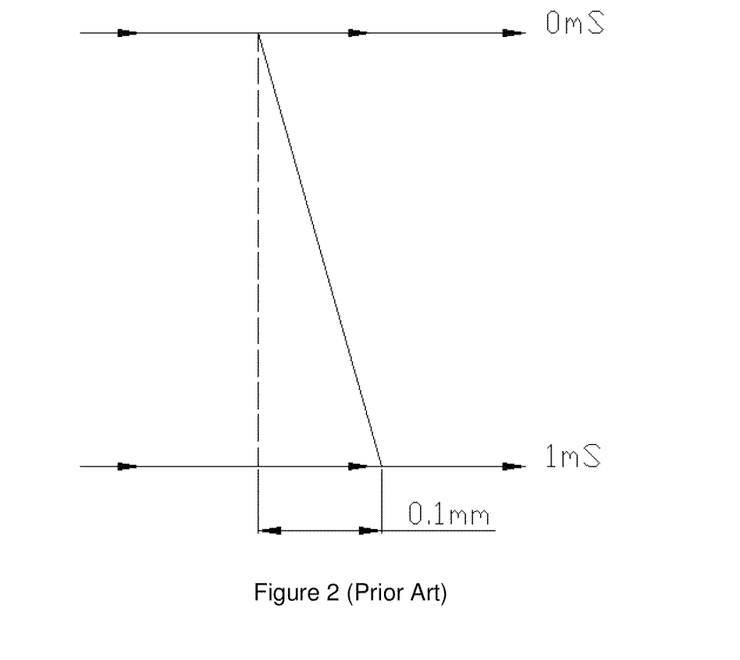
FIG. 2 is a graph of time on the Y axis against distance of the X axis showing the effects of movement of the hand held device of the optical probe on the CMOS imaging device.
Figure 3:
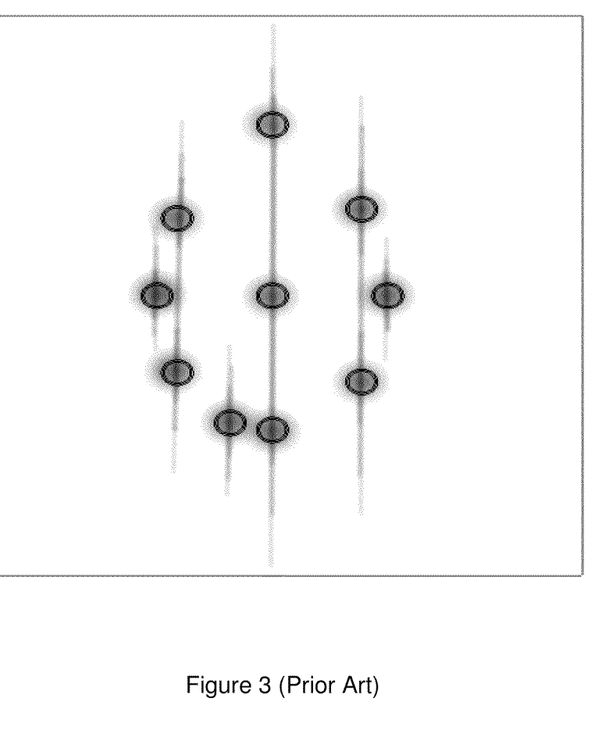
FIG. 3 is a digital image taken by a prior art optical probe using a CCD imaging device.
Figure 4:
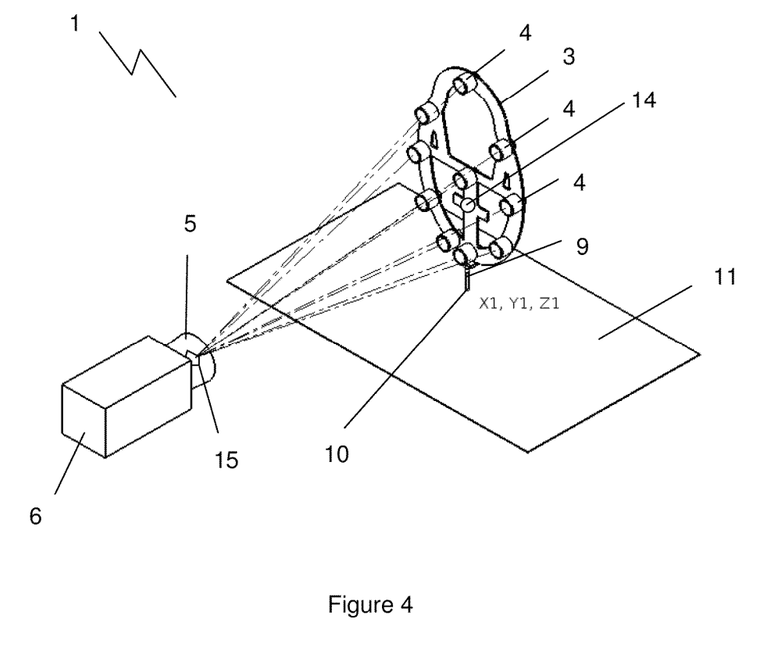
FIG. 4 shows a schematic view of an optical probe in a first position, in accordance with the present invention.
Figure 5:
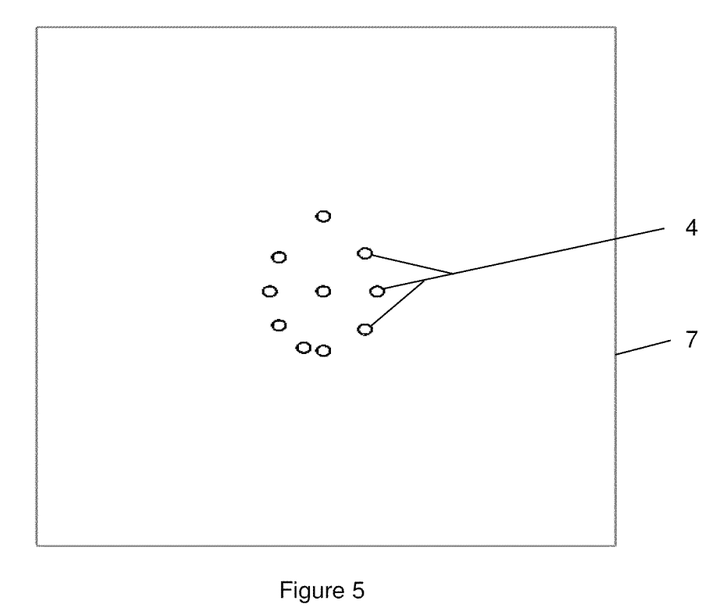
FIG. 5 shows a digital image taken by the digital camera of FIG. 4, in accordance with the present invention.
Figure 6:
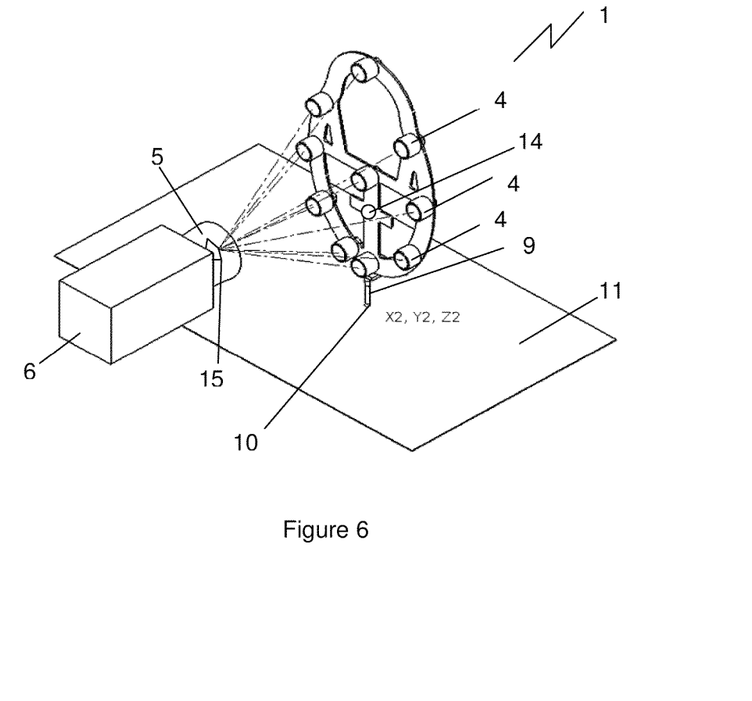
FIG. 6 shows a schematic view of the optical probe in a second position, in accordance with the present invention.
Figure 7:
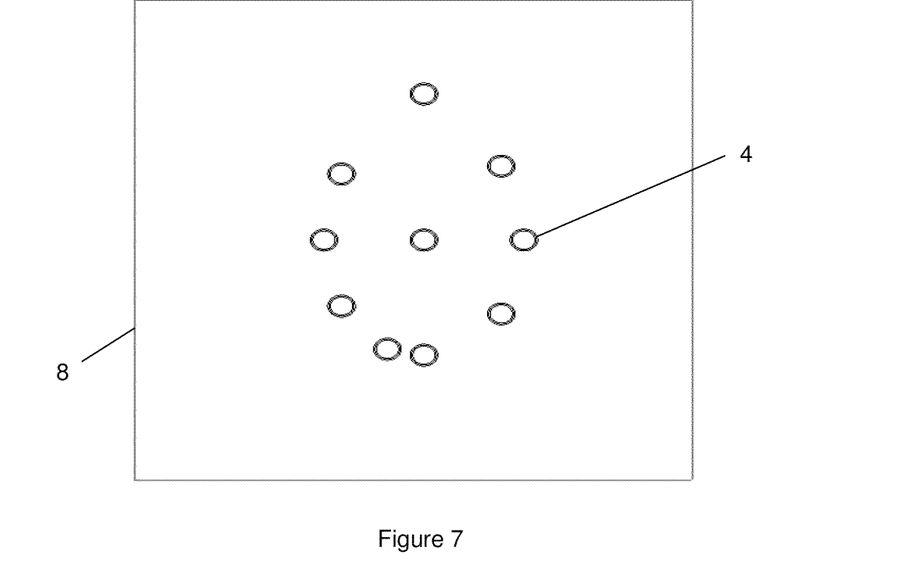
FIG. 7 shows a second digital image taken by the digital camera of FIG. 4 in the second position, in accordance with the present invention.

Referring initially to the prior art system shown in FIG. 1, where a high frequency digital image acquisition technique often referred to as an electronic shutter is used, a CMOS imaging chip is used in the digital camera D. As an optical probe is usually a hand held device, it cannot be considered a static device. If the optical probe moves at a speed of 100 mm/s, then it will move 0.1 mm in 1 millisecond, as illustrated in the digital image of FIG. 2 where the lamppost L of FIG. 1 appears diagonally because of the movement, and in the case of a CMOS sensor, this is known as tearing of the image. The accuracy of a typical CMM arm is less than 0.1 mm; therefore it is essential that the optical probe is imaged in as short a time as possible. In order to achieve this, prior art optical probes electronically read the digital camera sensor at a very high frequency. In the case of CCD sensors, this digital process is prone to blooming, smearing or overexposure during the imaging process, as shown in FIG. 3. While both of these problems may be acceptable in a traditional imaging system, they introduce unwanted errors in the estimation of the markers location.

Referring to the drawings and initially to FIGS. 4-7, there is shown an optical probe indicated generally by the reference numeral 1 having a hand held device 3 with markers 4. A digital camera 5 is provided for digitally imaging the handheld device 3 and markers 4 and a computer 6 is in communication with the digital camera 5 for calculating the position of the hand held device 3 from the position of the markers 4 in the digital image 7 (e.g., see FIG. 5), and from the position of the markers 4 in the digital image 8 (e.g., see FIG. 7). The hand held device 3 is used to take measurements wherein the digital camera 5 is a high resolution visible light digital camera 5 and the markers 4 are visible light markers 4.

Advantageously, visible light digital cameras 5 and visible light markers 4 are technically less complex, and as a result, cost less than the more specialized narrow spectrum cameras and the point source markers of the prior art.

The high resolution digital camera 5 has a mechanical shutter 15. Advantageously, a physical shutter 15 is used to expose the sensor during the acquisition of full resolution measurement images to eliminate the inaccuracies caused by tearing, blooming or smearing in the image. Actuation of the control means of the mechanical shutter 15 switches the high resolution visible light digital camera 5 between the low resolution mode and the high resolution mode. The mechanical shutter 15 is constantly in the open position in the low resolution tracking mode.

The handheld device 4 has ten spaced apart visible light markers 4 mounted thereon. The handheld device 4 also has a protruding measuring stylus 9 with a location tip 10 marking a point X1, Y1, Z1 on a planar surface 11 in FIG. 4 and marking a point X2, Y2, Z2 on a planar surface 11 in FIG. 6. Essentially, the spatial location of the location tip 10 of the measuring stylus 9 is known relative to the spatial location of the visible light markers 4. The handheld device 5 has a trigger 14 in operable engagement with the control arrangement of the high resolution visible light digital camera 5. The trigger 14 is in operable communication with the control arrangement of the mechanical shutter 15 of the high resolution visible light digital camera 5. The resolution of the digital camera is in the range of 5 to 500 megapixels with the most preferred resolution of the digital camera being is in the range of 10 to 30 megapixels.

The high resolution visible light digital camera 5 has two modes of operation. The first mode of operation is a low resolution video mode for real-time tracking of the handheld device 4. In this mode, the precise spatial location of the visible light markers 4 is not required to be extracted from the images recorded by the digital camera 5 and therefore the processing power in this mode is significantly reduced in comparison to the measuring mode. The ratio of measurement mode resolution to video mode resolution is in the range of between 10 and 20 to 1. There is also a significant relative change in frame rate. The second mode of operation is a very high resolution still mode for taking precise measurements of the spatial locations of the visible light markers 4.

As a result of the camera 5 and markers 4 being of the visible light type, more image processing is required to extract the markers 4 from the digital image in the measuring mode. To offset this, the visible light digital camera 5 can optionally operate in two modes, a low resolution video mode for real-time tracking of the handheld device 3 and a very high resolution still mode for taking measurements. Advantageously, the exact location of the markers 4 is only required in the still mode reducing the processing power during the low resolution tracking mode. A 16 MP camera creating 30 images of 24 bits per pixel would create 1.44 Gigabytes of information every second. Clearly, this is a huge amount of data to transmit from the camera to the computer and then to process in the computer. If a lower tracking resolution is acceptable it is therefore advantageous to create an optical probe which can operate at two resolutions, a low resolution for tracking and a high resolution for single important measurements.

Referring to FIG. 9, the visible light markers 4 are non-point visible light source markers 4. Advantageously, the non-point visible light source marker 4 is insensitive to perspective, over-exposure and poor focus. The non-point visible light source location marker 4 has a circle of material 16 with four quadrants 17, two of which are opaque and two of which are transparent. Advantageously, this design is unaffected by perspective, over-exposure, blur, and relative size. It also facilitates sub-pixel estimation of its position. The point q at which the two dark corners of the opaque quadrants 17 meet is considered the marker point. Advantageously, this corner meeting point q is clearly not sensitive to scale and hence perspective. The computer program executing on the computer which is used to locate the corner meeting point q uses an underlying mathematical algorithm. The core idea of the algorithm with reference to FIG. 9 is based on the observation that every vector from the centre q to a point p located within a neighborhood of q is orthogonal to the image gradient at p subject to image and measurement noise. Thus:

$$\epsilon_i = \nabla I_{pi}^T \nabla (q - p_i)$$

where $\nabla I_{pi}$ is the image gradient at the one of the points p in a neighborhood of q. The value of q is to be found such that $\epsilon_i$, is minimized. A system of equations may be set up with $\epsilon_i$'s set to zero:

$$\left( \sum_i \nabla I_{pi} \nabla \nabla I_{pi}^T \right) \cdot q - \left( \sum_i \nabla I_{pi} \nabla \nabla I_{pi}^T \nabla p_i \right) = 0$$

where the gradients are summed within a neighborhood ("search window") of q.

Calling the first gradient term G and the second gradient term b gives:

$$q = G^{-1} \nabla b$$

The algorithm sets the centre of the neighborhood window at this new centre q and then iterates until the centre keeps within a set threshold.

Figure 8:
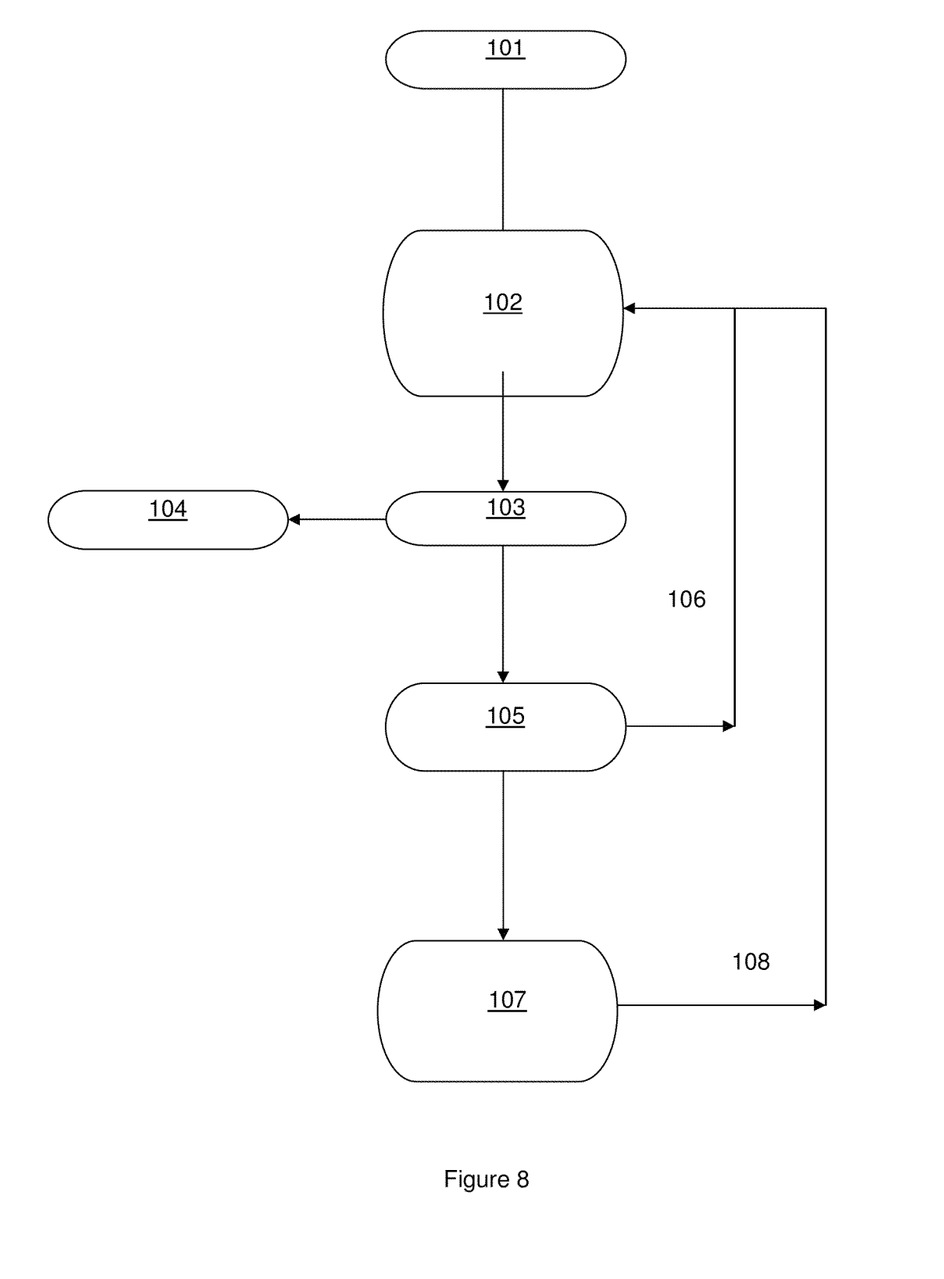
FIG. 8 is a flow diagram of the operation of the digital camera between a tracking mode and a marker measurement mode, in accordance with the present invention.

In use, with reference to FIG. 8, an operator grabs the hand held device 3 of the optical probe 1 from a normal resting position and the high resolution visible light digital camera 5 opens the mechanical shutter 15 at 101 and starts to track the handheld device 3 in the low resolution tracking mode at 102. The high resolution visible light digital camera 5 tracks the visible light markers 4 of the hand held device 3. In the event that the user is not ready to measure the coordinate, the option exists to turn the probe off at 103 with the optical probe 1 turned off at 104. Alternatively, the optical probe 1 continues to track the handheld device 3 in the low resolution video mode until the measuring stylus 9 of the hand held device 3 is located on a point X1, Y1, Z1 to be measured. When the handheld device 3 is located in this position, the option is available to take a full high resolution measurement at 105. If the operator does not want to take a measurement, the flow chart leads back at 106 to the low resolution tracking mode at 102. If the operator presses the trigger 14 on the hand held device 3 to operate a mechanical shutter 15 at 107, this simultaneously switches the high resolution visible light digital camera 5 between a low resolution tracking mode and a high resolution measuring mode. The high resolution visible light digital camera 5 takes a still image of the hand held device 3 and the visible light location markers 4 at this measuring location.

The high resolution visible light digital camera 5 reverts back to low resolution tracking mode at 108 after a high resolution still image is taken. The exact mode of operation of the shutter 15 involves the shutter 15 closing in preparation for taking a full resolution image, then opening and closing for taking the full resolution image and opening again thereby returning to video mode.

The computer 6 extracts the location information of the visible light markers 4 using the software based on the algorithm outlined above from the high resolution digital image file to provide spatial coordinates of the measured point. The operator moves the handheld device 3 to the next location X2, Y2, Z2 on the planar surface 11 and repeats the procedure to accurately measure the location of this coordinate. A particularly preferred camera is the range of Canon® SLR's where the mechanical shutter speed is in the range of 0.1 to 5 milliseconds.

Figure 10:
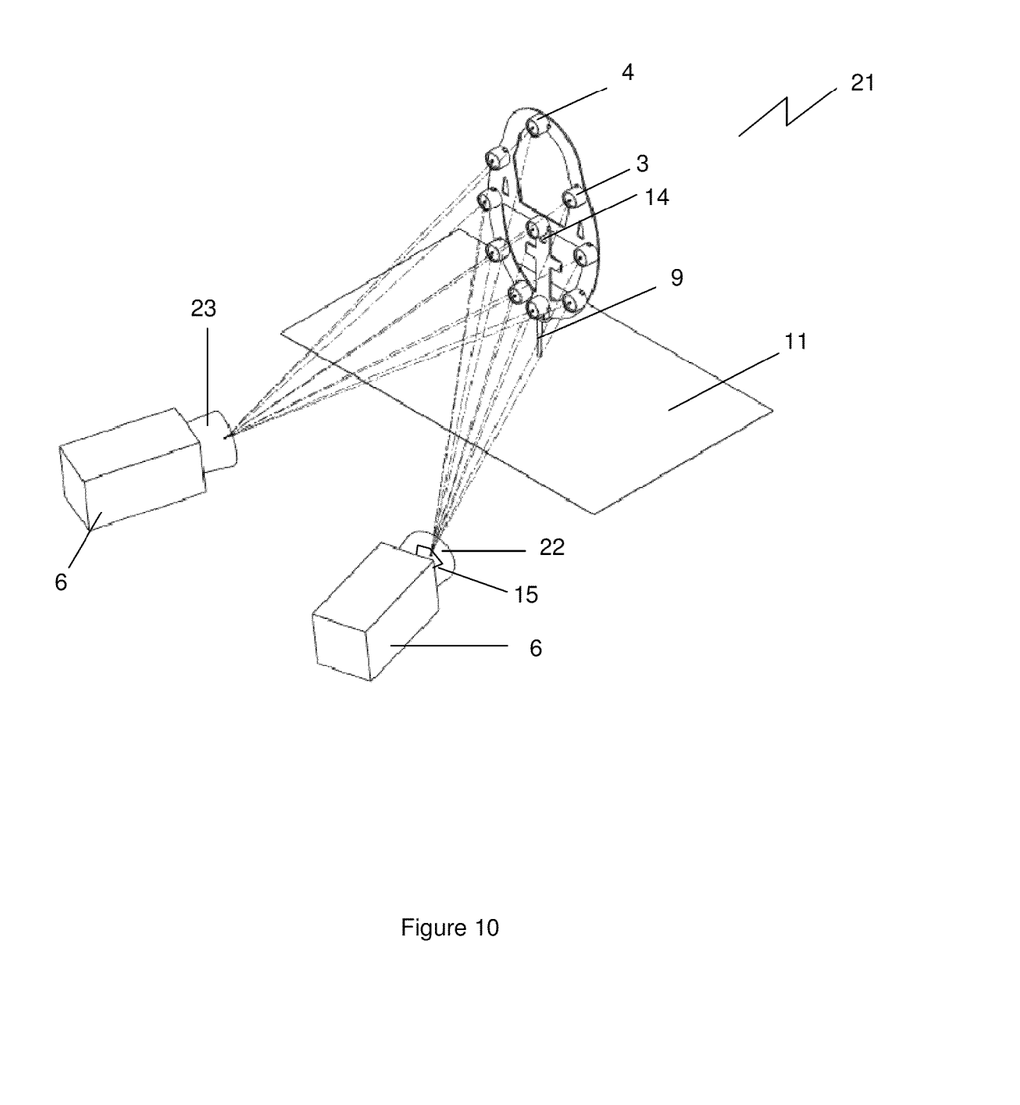
FIG. 10 is a perspective view of an optical probe using two cameras, in accordance with the present invention.

Referring to the drawings and now to FIG. 10, there is a shown a second embodiment of optical probe indicated generally by the reference numeral 21. In the second embodiment, a high resolution visible light digital camera 22 of the same type as described in relation to the first embodiment above is provided having a first mode of operation. A second visible light camera 23 having a second mode of operation is also operably engaged with the computer 6 for locating the position of the markers 4 of the hand held device 3. The second mode of operation of the second visible light camera 23 is a low resolution video mode for real-time tracking of the handheld device 3. In this mode, the precise geometrical location of the visible light markers 4 is not required to be extracted from the images recorded by the second visible light camera 23 and therefore the processing power of the computer 6 in this mode is significantly reduced in comparison to the measuring mode.

The second camera 23 is located so as to receive light at an alternative angle to the angle of incidence of the light falling on the high resolution visible light camera 22. Advantageously, the second camera 23 located at an angularly displaced location relative to the direct line of light from the hand held device 3 to the high resolution camera 22 improves the depth measurement accuracy of the markers 4 by triangulation. In this arrangement, the second camera 23 is any one of a low resolution video mode camera such as a webcam, a high resolution visible light camera with a high resolution still mode or a high resolution visible light camera with a high resolution still mode and a low resolution video tracking mode.

With the installation of the second camera 23, a wide variety of operating modes are available to the optical probe 21. High resolution visible light camera 22 can track the handheld device 3 in a low resolution mode until the trigger 14 is pressed. At this point, the camera 22 can switch between the tracking mode and the still measuring mode. If the camera 23 is a low resolution tracking mode camera, the most recent low resolution image can be used by the computer 6 to assist with the generation of the location coordinates of the markers 4. Alternatively, if the camera 23 has high resolution capabilities, pressing the trigger on the handheld device 3 can cause either or both cameras 22, 23 to take a high resolution still mode image for processing the location coordinates of the markers 4. Also, if both cameras 22, 23 have high resolution and low resolution capabilities, then either or both cameras 22, 23 can track the hand held device 3 in low resolution mode and either or both cameras 22, 23 can take a high resolution image when the trigger 14 is pressed. This will improve the accuracy of both the general location of the markers 4 in the low resolution mode as well as the specific location of the markers 4 in the high resolution mode.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

Furthermore, while the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optical probe, comprising:
   a hand held device with markers;
   a digital camera for digitally imaging the handheld device with markers; and
   a computer for calculating the position of the hand held device from a position of the markers in the digital image wherein the digital camera is a high resolution visible light digital camera and the markers are visible light markers;
   wherein the optical probe has two modes of operation, a first mode of operation being a low resolution video mode for real-time tracking of the handheld device and a second mode of operation being a high resolution still mode for measuring the exact location of the handheld device.

2. The optical probe as claimed in claim 1, wherein the high resolution visible light digital camera has two modes of operation, a first mode of operation being a low resolution video mode for real-time tracking of the handheld device and a second mode of operation being a high resolution still mode for measuring the exact location of the handheld device.

3. The optical probe as claimed in claim 1, wherein the high resolution visible light digital camera has a mechanical shutter and control means therefor and the handheld device has trigger means in operable communication with control means of the mechanical shutter of the high resolution visible light digital camera.

4. The optical probe as claimed in claim 3, wherein the control means of the mechanical shutter is operable for switching the high resolution visible light digital camera between the low resolution video mode and the high resolution still mode.

5. The optical probe as claimed in claim 1, further comprising a second visible light digital camera operably engaged with the computer for locating the position of the markers of the hand held device.

6. The optical probe as claimed in claim 5, wherein the second visible light digital camera is any one of a low resolution video mode camera, a high resolution visible light digital camera with a high resolution still mode, or a high resolution visible light digital camera with a high resolution still mode and a low resolution video tracking mode.

7. The optical probe as claimed in claim 5, wherein the second visible light digital camera is located so as to receive light at an alternative angle to the angle of incidence of the light falling on the high resolution visible light camera.

8. A method of operating an optical probe having a high resolution visible light digital camera, a computer, a hand held device with visible light markers, comprising:
   identifying the location of the visible light markers using a high resolution visible light digital camera;
   tracking visible light markers of the hand held device in a low resolution video mode until the hand held device is located on a point to be measured;
   switching the optical probe between a low resolution tracking mode and a high resolution measuring mode; and
   taking a still image of the hand held device and visible light markers at this measuring location.

9. The method of operating an optical probe as claimed in claim 8, wherein the optical probe further comprises a second visible light digital camera, the method further comprising identifying the location of the visible light markers using both the high resolution visible light digital camera and the second visible light digital camera.

10. The method of operating an optical probe as claimed in claim 9, wherein the second visible light digital camera has high resolution capabilities, the method further comprising pressing the trigger on the handheld device so either or both visible light digital cameras take a high resolution still mode image for processing the location coordinates of the markers.

11. The method of operating an optical probe as claimed in claim 9, wherein both visible light digital cameras have high resolution and low resolution capabilities, the method further comprising either or both visible light digital light cameras tracking the hand held device in low resolution mode and either or both visible light digital cameras taking a high resolution image when the trigger is pressed.

12. The method of operating an optical probe as claimed in claim 8, the method further comprising the computer extracting the general location information of the visible light markers from a low resolution digital image until the hand held device is located on a point to be measured, the method further comprising the computer extracting the exact location information of the visible light markers using a high resolution digital image file to provide spatial coordinates of the measured point starting from the information provided by the generally defined spatial coordinates of the low resolution image file.

13. A method of operating an optical probe having a high resolution visible light digital camera, a computer, a hand held device with visible light markers, comprising:
   identifying the location of the visible light markers using a high resolution visible light digital camera;
   tracking visible light markers of the hand held device in a low resolution video mode until the hand held device is located on a point to be measured;
   switching the optical probe between a low resolution tracking mode and a high resolution measuring mode; and
   taking a still image of the hand held device and visible light markers at this measuring location.

14. The method of operating an optical probe as claimed in claim 13, wherein the optical probe further comprises a second visible light digital camera, the method further comprising identifying the location of the visible light markers using both the high resolution visible light digital camera and the second visible light digital camera.

15. The method of operating an optical probe as claimed in claim 14, wherein the second visible light digital camera has high resolution capabilities, the method further comprising pressing the trigger on the handheld device so either or both visible light digital cameras take a high resolution still mode image for processing the location coordinates of the markers.

16. The method of operating an optical probe as claimed in claim 14, wherein both visible light digital cameras have high resolution and low resolution capabilities, the method further comprising either or both visible light digital light cameras tracking the hand held device in low resolution mode and either or both visible light digital cameras taking a high resolution image when the trigger is pressed.

17. The method of operating an optical probe as claimed in claim 13, the method further comprising the computer extracting the general location information of the visible light markers from a low resolution digital image until the hand held device is located on a point to be measured, the method further comprising the computer extracting the exact location information of the visible light markers using a high resolution digital image file to provide spatial coordinates of the measured point starting from the information provided by the generally defined spatial coordinates of the low resolution image file.

* * * * *